Dec. 6, 1966     L. HEDSTROM ET AL     3,289,296
SHEARS, SNIPS AND THE LIKE, WITH LOCKED BUSHING
PIVOT BEARING
Filed Sept. 20, 1965
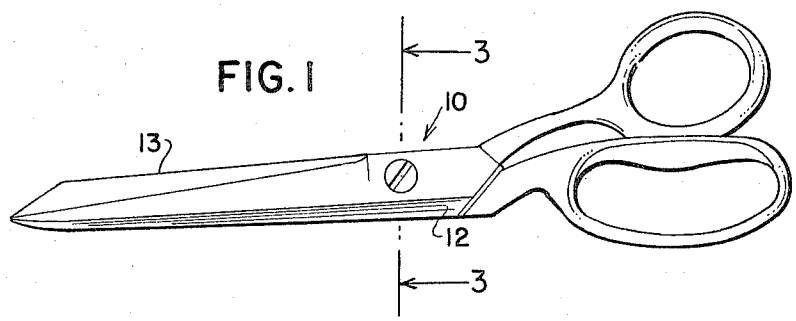
FIG. 1
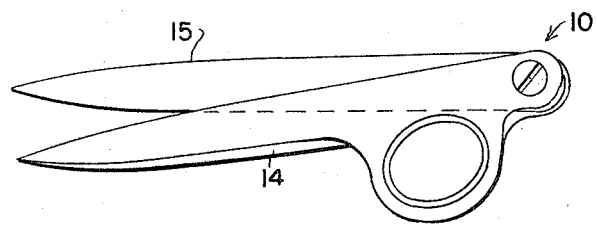
FIG. 2
FIG. 8
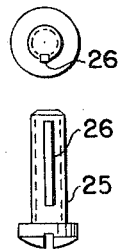
FIG. 7
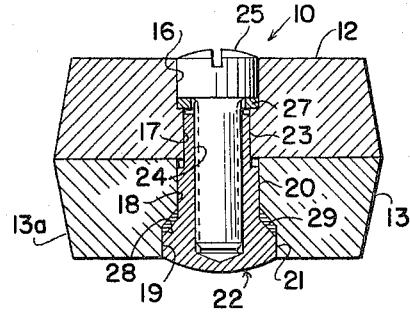
FIG. 3
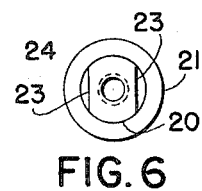
FIG. 6
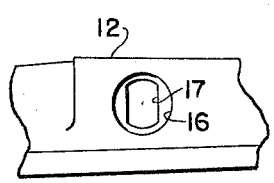
FIG. 4
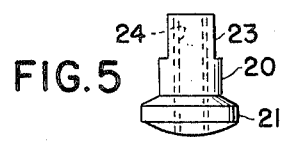
FIG. 5
*INVENTORS*
Lars Hedstrom &
Joseph Rega
*by* Sparrow and Sparrow
ATTORNEYS.

United States Patent Office 3,289,296
Patented Dec. 6, 1966

3,289,296
SHEARS, SNIPS AND THE LIKE, WITH LOCKED BUSHING PIVOT BEARING
Lars Hedstrom, Mendham, and Joseph Rega, Belleville, N.J., assignors to J. Wiss and Sons Company, Newark, N.J.
Filed Sept. 20, 1965, Ser. No. 488,662
2 Claims. (Cl. 30—267)

This invention relates to shears, snips, scissors and the like tools in general and to the pivot means relating to these tools in particular. It constitutes a continuation-in-part of co-pending application Serial No. 355,777 filed March 30, 1964, and now abandoned.

The pivot of shears, snips, scissors and the like tools is of paramount importance, for the proper functioning thereof. However, most of these pivot constructions are either poorly made or inefficient in the more or less economical implements, or they are precision made in the expensive models. But, it is known in the art that the less expensive constructions have some undesirable shortcomings, because they simply consist of a rivet, with no position control of the correct cooperation of the two blade edges of the shears, or they consist of a screw which is merely screwed into one of the blades. In the latter case, happenstance or chance prevails is setting the engagement of the cutting edges of the blades properly, and also of taking the shears apart for re-sharpening of the blade edges, but the screws either are too tight or too loose and in most cases they unlock themselves during the operation of the shears.

It is intended to improve the aforementioned condition by this invention which consists in the novel parts, construction arrangements, combinations and improvements as may be shown and described in connection with the implements or tools herein disclosed by way of example only and as illustrative of a preferred embodiment. Objects and advantages of the invention will be set forth in part hereafter and in part will be obvious herefrom or may be learned by practicing the invention, the same being realized and attained by means of the instrumentalities and combinations pointed out in the appended claims.

It is the general object of the present invention to provide scissors, snips and the like cutting tools having improved wear-resistant bushing-type pivots which may be easily assembled and disassembled for re-sharpening, and which may be adjusted to the user's preference for blade operating tension.

A further object of the present invention resides in the elimination of intermediate elements between the adjusting screw and the pivot bushing and in locking one blade permanently with the pivot bushing.

Another object of the invention is to provide for antifriction means between the axial bearing faces of the other blade and the head of the pivot bushing.

A still further object of the present invention is to provide a bushing-type pivot for scissors, shears and the like, which also serves the purpose of a bearing for one of the blades of the scissors and shears into which is incorporated a tension adjusted screw which does not rotate in relation to the blade in which the bushing is locked, and which is further locked in this tension setting by: (a) mechanical distortion of the thread in either the screw or the bushing; (b) incorporation of an interference element in either the thread of the screw or the internal thread of the bushing; and (c) mechanical mismating of the threads of the screw of the bushing either by deliberate mismatch of screw threads per inch or interference of the major diameters of the threads.

Another object of the invention is to provide a pivot for scissors, shears, snips and the like, which is locked in one blade thereof and which is rotatably swingable together therewith relative to the other blade thereof.

A further object of the present invention is to provide a pivot for the aforementioned tools or implements, which is secured in such manner as neither to tighten nor to unlock itself during the operation of the tool or implement.

It is yet another object of the invention to provide a very practical, efficient and safely operating pivot construction for such tool or implement, which is inexpensive and can be easily and economically mass-produced.

Various further and more specific purposes, features and advantages will clearly appear from the detailed description given below taken in connection with the accompanying drawing which forms part of this specification and illustrates merely by way of example one embodiment of the device of the invention. In the following description and in the claims, parts will be identified by specific names for convenience, but such names are intended to be as generic in their application to similar parts as the art will permit. Like reference characters denote like parts in the several figures of the drawing, in which:

FIG. 1 illustrates a conventional type of scissors embodying the device of the invention;

FIG. 2 illustrates a conventional type of snips embodying the device of the invention, adapted for use, for example, in the apparel industry;

FIG. 3 shows a cross-section of the pivot constructions in an enlarged scale, taken along the line 3—3 of FIG. 1, partly broken away;

FIG. 4 is a plan view of the upper blade of the scissors shown in FIGS. 1 and 3, partly broken away;

FIG. 5 is a side view of the bushing-type pivot bearing;

FIG. 6 is a bottom view of the pivot member shown in FIG. 5, taken in the direction of the arrow 5;

FIG. 7 is a side view of the locking screw for the pivot bearing; and

FIG. 8 is a bottom view of the locking screw shown in FIG. 7.

Referring now in more detail to the drawing illustrating a preferred embodiment by which the invention may be realized, there is shown in FIGS. 1 and 2 two types of cutting tools in which the new locking pivot means or device may be used. FIG. 1 shows a conventional scissors 11 having an upper blade 12 and a lower blade 13. The pivot means is generally designated by numeral 10. FIG. 2 illustrates a typical snip having an upper blade 14 and a lower blade 15. The pivot means is generally designated by the numeral 10. The construction of the locking pivot means or device 10, according to an embodiment of the invention, is shown in FIG. 3. The pivot member or shaft 22 and locking screw 23 are shown in more detail in FIGS. 5 and 7, respectively. The upper blade 12 has a pivot bore which has preferably a cylindrical countersunk portion 16, whereas the bore itself is slotted as indicated by the numeral 17. The lower blade 13 has a cylindrical bore 18 which may be countersunk, as indicated by the numerical 19. It is understood that the countersinking may be eliminated.

The pivot member or shaft 22 comprises the straight cylindrical portion 20 and a head 21. The upper part of the cylindrical portion 20 is cut to provide two flat sides 23. A threaded hole 24 is provided. This hole may or may not run axially through the entire length of shaft 22. The combined length of the cylindrical portion 20 that does not have the flat sides 23 and that portion of the head 21 which is flush with the face 13a of blade 13, is slightly less than the thickness of the lower blade 13 at the pivot point, so that only the part having the flat sides 23 enters the slotted bore 17 in upper blade 12, thus anchoring the pivot shaft 22 in the upper blade 12. The pivot shaft 22 is eventually locked by the locking screw 25 which has on one side an elastic or a resilient insert 26, preferably made of nylon, Teflon or the like polymerisate, for securing the screw in place. It is understood that any other suitable material may be employed as an insert. The pivot shaft 22 may be made of steel or the like durable metal; or shaft 22 may be made of nylon or Teflon or the like, or any other suitable material, in which case the axial hole 24 does not need to be threaded and screw 25 does not need insert 26, since screw 25, when manipulated, will cut a thread in hollow shaft 22.

As shown in FIG. 3, a special washer 27 is inserted between the head 25 of the adjusting screw and the bottom of recess 16 of blade 12. This washer may be made of a material having a low friction coefficient and a low degree of extrudability, such as nylon, Teflon, Delrin, bronze or hardened steel. The flat sides 23 of shaft 22 and those of blade 13, slotted bore 17 (FIG. 4) will not match exactly because of manufacturing tolerances. Special washer 27 lowers the friction between head of screw 25 and bottom of recess 16 of blade 12. Thus, the likelihood of the adjusting screw working loose is minimized. Between the locking face 28 of shaft 22 and the corresponding countersunk part 19 of bore 18 of blade 13, a friction-reducing thrust bushing 29 is inserted so that an even operating force on the movable blade is insured.

The operation can be described with reference to FIG. 3. Since the combined length of cylindrical portion 20 and that portion of head 21 which is flush with face 13a is shorter than the thickness of lower blade 13, the pivot shaft 22 will have upper blade 12 locked thereon by means of the flattened sides 23 and the locking screw 25. Thus, the upper blade 12 swings rotatably together with pivot shaft 22 and screw 25, whereas lower blade 13 rotates alone about straight cylindrical portion 20 and head 21. Obviously, locking screw 25 cannot change its position relative to pivot shaft 22 and to upper blade 12, except to the extent of the allowable tolerances between flats in slotted bore 17 in blade 12, and flats 23 in shaft 22. Washer 27 under screw head 25 prevents this small movement from loosening screw 25, so that engagement of the cutting edges of the blades of the shears or the like remains constant which is essential for the proper functioning of this kind of tool.

It is understood that the pivot member or shaft 22 could be locked in its proper tension setting by either a mechanical distortion of the thread in the screw 25 or shaft 22, or by the incorporation of interference element 26 of screw 25, or by mechanical mismating of the threads of the screw 25 either by deliberately mismatching the threads of screw 25 or by interference of the major diameter or of the pitch diameter of the threads.

While the invention has been described and illustrated with respect to a certain preferred example which gives satisfactory results, it will be understood by those skilled in the art after understanding the principle of the invention that various other changes and modifications may be made without departing from the spirit and scope of the invention and it is intended therefore in the appended claims to cover all such changes and modifications.

We claim:
1. In a shear, snip, scissors or the like cutting tool having an upper and lower blade, said upper and lower blades having cutting edges; a countersunk pivot hole in said upper blade, said hole of said upper blade being slotted, a countersunk pivot hole in said lower blade, said hole of said lower blade being cylindrical, a pivot comprising a cylindrical head countersunk in said lower blade, a cylindrical shaft portion adjacent said head, and a flat-sided end portion extending from said cylindrical shaft portion, said countersunk head and said cylindrical shaft portion having a combined length of substantially less than the thickness of the lower blade, said flat-sided portion fitting into said slotted hole of said upper blade, said pivot shaft having a threaded bore extending therethrough, and a locking screw having a head, and an antifriction washer adjacent said head in said countersunk pivot hole in said upper blade, said washer being disposed with relation to said head in said upper blade for preventing said screw from loosening due to small movement caused by tolerances in assembly.

2. Shears, snips, scissors and the like comprising a pair of cooperating cutting blades, one of said blades having a slotted pivot hole and the other of said blades having a cylindrical pivot hole with a countersunk part, and a pivot device comprising a shaft having a cylindrical portion and a reduced flat-sided portion extending therefrom, said cylindrical portion having a cylindrical head, both said cylindrical portion and said head fitting into said cylindrical hole and into said countersunk part of said other of said blades and said flat-sided portion fitting into said slotted pivot hole of said one of said blades, said shaft having an axially extending bore, a locking member in said bore, and friction-reducing bushing interposed between said head and said countersunk part of said cylindrical hole.

References Cited by the Examiner

UNITED STATES PATENTS

| | | | |
|---|---|---|---|
| 1,545,211 | 7/1925 | Storz | 30—266 |
| 2,377,405 | 6/1945 | Davies | 151—14 |
| 2,776,482 | 1/1957 | Hafekost | 30—267 X |
| 2,788,829 | 4/1957 | Edwards | 151—7 |
| 3,079,968 | 3/1963 | Buckley | 151—7 |

WILLIAM FELDMAN, *Primary Examiner.*

J. C. PETERS, *Assistant Examiner.*